United States Patent [19]

Asscher

[11] Patent Number: 4,591,952
[45] Date of Patent: May 27, 1986

[54] ELECTRICAL ELEMENT SUCH AS A TANTALUM AND SOLID-ELECTROLYTE CAPACITOR

[75] Inventor: Jean-Claude Asscher, Paris, France

[73] Assignee: Tekelec-Airtronic, France

[21] Appl. No.: 641,761

[22] Filed: Aug. 17, 1984

[30] Foreign Application Priority Data

Jan. 31, 1984 [FR] France .................. 84 01482

[51] Int. Cl.⁴ .................. H01G 9/00; H01G 7/00
[52] U.S. Cl. .................. 361/433; 29/25.42
[58] Field of Search .............. 361/433, 306, 307, 308; 29/25.42

[56] References Cited

U.S. PATENT DOCUMENTS 3,314,124  4/1967  Okamoto et al. ............. 361/433 X
3,544,853  12/1970  Giles ........................ 361/433

FOREIGN PATENT DOCUMENTS 3139878  2/1983  Fed. Rep. of Germany.
2362480  3/1978  France.

Primary Examiner—Donald A. Griffin
Attorney, Agent, or Firm—Steinberg & Raskin

[57] ABSTRACT

Solid electrolyte capacitor wherein the anode end-fitting is constituted by a massive metallic element having sufficient thermal inertia to compensate for the difference in melting temperature of the materials constituting the anode end-fitting and the anode wire.

10 Claims, 4 Drawing Figures

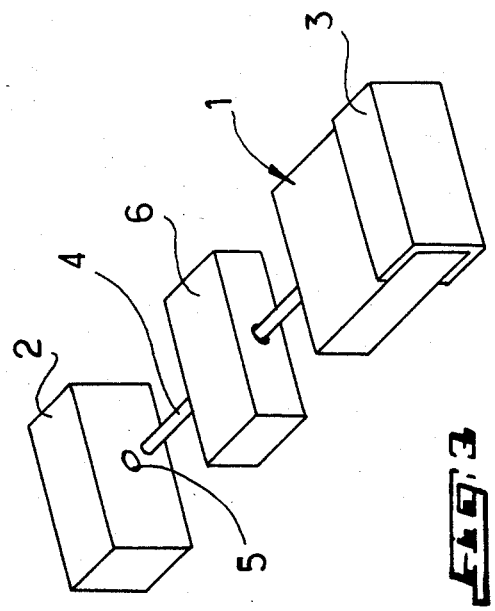
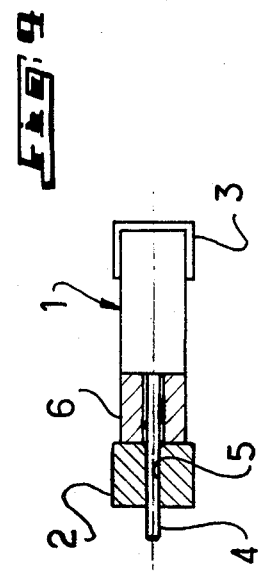
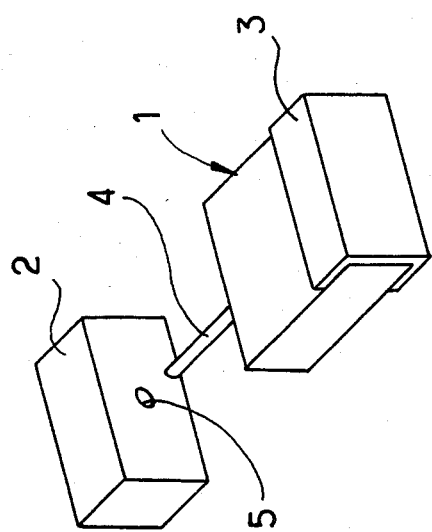
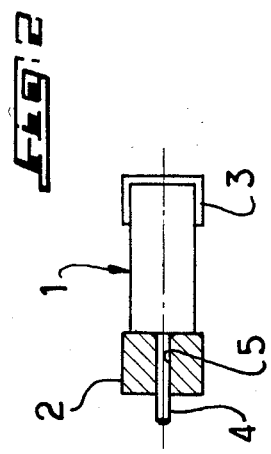

ELECTRICAL ELEMENT SUCH AS A TANTALUM AND SOLID-ELECTROLYTE CAPACITOR

BACKGROUND OF THE INVENTION

The present invention relates to an electrical element such as a solid-electrolyte capacitor including a body constituting an anode and metallic end-fittings constituting output electrodes, the anode end-fitting being welded on an anode wire projecting from the said body, the anode wire and the said body being made of a metal such as tantalum having a higher melting temperature than the anode end-fitting metal which is preferably metal such as nickel or a nickel alloy.

In the known capacitors of this type, the anode end-fitting is shaped as a clevis or as a hollow capsule formed of a thin sheet whose thickness is several times smaller than the diameter of the anode wire. The latter is circular in section and is therefore in a massive or solid form.

Under such conditions, the assembling of the anode end-fitting on the anode wire by welding is very difficult to perform. Indeed, for the welding to take place, a melting of the parts to be assembled must be obtained. Now since the wire is in massive form, a considerable amount of heat is necessary to reach its melting temperature. In contrast, the thermal inertia of the end-fitting constituted by a thin sheet is relatively low.

This is the reason why the assembling of the known capacitors which has just been described is very difficult to control. There are a great risk of vapourization of the end-fitting material and a very high proportion of defective products after the welding operation. Defects such as burnings or perforations, or insufficient service life, of the end-fitting are of frequent occurrence.

SUMMARY OF THE INVENTION

The present invention has for a purpose to remedy the abovementioned disadvantages of the known capacitors.

To this end, there are proposed electrical elements, such as capacitors, which are characterized by the fact that the anode end-fitting is constituted by a massive or solid metallic element possessing sufficient thermal inertia to compensate for the difference in melting temperature of the materials constituting the anode end-fitting and the anode wire.

According to an advantageous feature of the invention, the anode end-fitting consists of a parallelepipedic block with a hole extending therethrough to allow the passage of the anode wire.

According to another advantageous feature of the invention, a spacer or the like made of a dielectric material such as for example fritted glass, is interposed between the anode body and the end-fitting in the form of a block, thus allowing an assembly of desired length to be obtained.

BRIEF DESCRIPTION OF THE DRAWINGS

The invention will be better understood and other purposes, features, details and advantages thereof will appear more clearly as the following explanatory description proceeds with reference to the appended diagrammatic drawings given solely by way of example illustrating two forms of embodiment of the invention and wherein:

FIG. 1 is an exploded perspective view of a first form of embodiment of a capacitor according to the present invention;

FIG. 2 is a side, partially sectional view of the capacitor illustrated in FIG. 1;

FIG. 3 is an exploded perspective view of a second form of embodiment of a capacitor according to the present invention; and FIG. 4 is a side, partially sectional view, of the form of embodiment of FIG. 3.

DESCRIPTION OF THE PREFERRED EMBODIMENTS

In the examples of the embodiments of the invention which are illustrated in the Figures, the electrical element consists of a tantalum and solid-electrolyte capacitor which includes a generally parallelepiped-shaped body 1 and metallic end-fittings 2, 3 which constitute the electrodes allowing the connection of the capacitor to an electric circuit. The body 1 has the typical and widely known structure of a tantalum and solid-electrolyte capacitor. Since the invention does not relate to this structure, it is sufficient to remember that the body includes essentially a block constituted by compressed and fritted tantalum particles, which constitutes the anode of the capacitor and is surrounded by layers intended to constitute the dielectric and the cathode of the capacitor. The presence is also noted of a wire, stem or bar 4 of solid tantalum, which forms an integral part of the anode and projects from the block 1.

The present invention relates to the shape of the anode end-fitting 2 and to its fixing to the anode wire 4, whereas the end-fitting 3 has the usual shape of a clevis or stirrup.

As appears from the Figures, the anode end-fitting 2 is in the form of a parallelepiped-shaped block of nickel or nickel alloy. Extending throughout the said block is a hole 5 allowing the passage of the anode wire 4. This massive or solid end-fitting 2 in the form of a metallic block will be welded on the wire by any suitable known means. The dimensions of the block 2 are so selected as to impart to the block sufficient thermal inertia to compensate for the difference in melting temperature of the two parts to be assembled. The principle consists in equilibrating the reactions of the two parts to the effects of the temperature by compensating for the lower melting temperature of the end-fitting (of the order of 1500° C. in the case of nickel) by a high thermal inertia acquired as a result of the mass effect, with respect to the melting temperature of the order of 3000° C. of the tantalum wire.

The strictness of the geometrical accuracy and the mechanical rigidity of the assembly can be increased by adhesively assembling the block 2 to the body 1 of the capacitor. Another advantage in the use of an electrode end-fitting in the form of a massive block lies in the fact that it is no longer necessary to run a filling material around the wire 4 between the anode and the end-fitting.

FIGS. 3 and 4 illustrate a second form of embodiment of a capacitor according to the invention, which differs from the first form of embodiment shown in FIGS. 1 and 2 by the fact that a spacer element 6 is interposed between the body 1 and the anode end-fitting 2. This spacer is made of a dielectric material, for example of fritted glass, and allows varying the length of the capacitor and obtaining an assembly of desired length. As appears from the Figures, the spacer is in the form of a block which is slid onto the anode wire 4.

What is claimed is:

1. An electrical element such as a solid-electrolyte capacitor, including a body constituting an anode and metallic end-fittings constituting output electrodes, the anode end-fitting being welded on and assembled to an anode wire projecting from said body by welding involving melting of the wire and anode end-fitting materials in the zone of assembly, the anode wire and said body being made of a metal having a melting temperature higher than that of the metal of the anode end-fitting, wherein the anode end-fitting is constituted by a massive metallic element of dimension such that it possesses sufficient thermal inertia to compensate for the difference in melting temperature of the materials constituting the anode end-fitting and the anode wire.

2. An electrical element according to claim 1, wherein said anode end-fitting consists of a block in the form of a parallelepiped.

3. An electrical element according to claim 2, wherein said block is secured on said body.

4. The element of claim 3 wherein said block is adhesively secured on said body.

5. The element of claim 1 wherein said anode wire and body are made of tantalum.

6. The element of claim 1 wherein said anode end-fitting is made of nickel or a nickel alloy.

7. An electrical element such as a solid-electrolyte capacitor, including a body constituting an anode and metallic end-fitting constituting output electrodes, the anode end-fitting being welded on an anode wire projecting from said body, the anode wire and said body being made of a metal having a melting temperature higher than that of the metal of the anode end-fitting, wherein the anode end-fitting is constituted by a massive metallic element possessing sufficient thermal inertia to compensate for the difference in melting temperature of the materials constituting the anode end-fitting and the anode wire and wherein a spacer made of a dielectric material is interposed on the anode wire between the body and the anode end-fitting in the form of a block, the length of the spacer being variable to allow for obtaining of an assembly of desired length.

8. The element of claim 7 wherein said anode wire and body are made of tantalum.

9. The element of claim 7 wherein said anode end-fitting is made of nickel or a nickel alloy.

10. The element of claim 7, wherein the dielectric material is fritted glass.

* * * * *